3,008,988
SYNTHESIS OF BORAZOLES
Paul F. Winternitz, New York, N.Y., and Leo J. Spillane, El Dorado, Ark., assignors, by mesne assignments, to Thiokol Chemical Corporation, a corporation of Delaware
No Drawing. Filed Oct. 25, 1956, Ser. No. 618,410
1 Claim. (Cl. 260—551)

The present invention relates to a new process for the synthesis of aliphatic substituted hexahydro-s-triazaborines from nitriles and diborane. Two substituted hexahydro-s-triazaborines, N-N'-N''-triethylhexahydro-s-triazaborine and N-N'-N''-tri-(3-methoxypropyl) hexahydro-s-triazaborine, were synthesized from acetonitrile and β-methoxypropionitrile, respectively. The physical properties of both compounds were determined and identity was established by chemical structure proof.

This application is a continuation-in-part of application Serial Number 280,664, filed April 4, 1952, co-pending at the time of filing of the present application and now abandoned.

N-N'-N''-triethylhexahydro-s-triazaborine and N-N'-N''-tri-(3-methoxypropyl)-hexahydro-s-triazaborine are useful as rocket fuels and jet fuels in their liquid state without dilution with other fuels. When the compounds are used in this manner, the specific impulse of the rocket or jet motor is improved over that achieved with many previously known other fuels. As additives to ordinary gasolines, they are useful in the percentage of about 2 to 5, by weight, directly in the gasoline to produce resultant gasoline fuels of higher anti-knock quality, by slowing the rate of combustion, and by providing a higher overall heat content. The aforementioned compounds are also useful as powerful reducing agents in various organic reactions and are used as such in the normal manner applied to reducing agents.

It is, therefore, an object of the present invention to provide a new and useful process for the synthesis of aliphatic substituted hexahydro-s-triazaborines from nitriles.

It is also an object of the present invention to provide a new and useful method for the synthesis of N-N'-N'' triethylhexahydro-s-triazaborine from acetonitrile.

It is another object of the present invention to provide a new and useful method for the synthesis of N-N'-N''-tri-(3-methoxypropyl)-hexahydroborine from β-methoxypropionitrile.

It is also an object of the present invention to provide a new and useful method for the preparation of solid acetonitrile-borine in bulk.

The formation of co-ordination complexes between compounds of boron and nitrogen is known in the art and conversion of the co-ordination compounds derived from amines (or ammonia) to hexahydro-s-triazaborine derivatives is also a known reaction, as indicated in the literature. These methods for preparing hexahydro-s-triazaborines are comprised essentially of two types:

(a) Dehydrohalogenation of co-ordination compound derived from an amine and a boron halide:

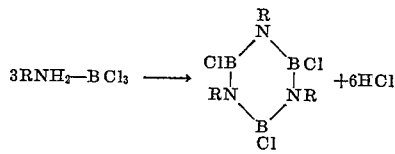

and (b) Dehydrogenation of a co-ordination compound derived from an amine and a boron hydride:

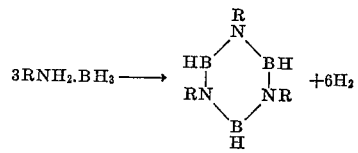

The first type has been successfully applied previously only when "R" is an aromatic hydrocarbon group or hydrogen, while the second requires the use of elevated temperatures and has been successful only when "R" is an aliphatic hydrocarbon group or hydrogen. For example, the most recent modification (Schaeffer and Anderson, Journal of American Chemical Society 71, 2143, year 1949) requires temperatures above 200° C. for synthesis of N-N'-N''-trimethylhexahydro-s-triazaborine from methylamine and lithium borohydride.

The formation of co-ordination complexes between nitrile and boron compounds has received little experimental attention. The reaction of acetonitrile at —80° C. with diborane to give a white, unstable solid corresponding to the empirical formula $CH_3CN.BH_3$ was reported in 1942 by Schlesinger and Burg (Chem. Rev. 31, 1, year 1942). However, no experimental details were given and none have been published since that time. Reaction of acetonitrile with $BF_3$ also has been observed to lead to a co-ordination compound having the formula $CH_3CN.BF_3$ (Hoard, Owen, Buzzell, and Salmon, Acta. Cryst. 3, 121, year 1950).

An investigation of the reaction between diborane and aliphatic nitriles by the present inventors has resulted in a new and useful process for the preparation of aliphatic substituted hexahydro-s-triazaborines. N-N'-N''-triethylhexahydro-s-triazaborine and N-N'-N''-tri-(3-methoxypropyl)-triazaborine were synthesized from acetonitrile and beta-methoxypropionitrile, respectively and their structures were determined by chemical methods.

When diborane mixed with nitrogen is passed with vigorous stirring into pure acetonitrile or its suspension in a petroleum solvent, e.g. petroleum ether or isobutane, a white solid corresponding to the formula $CH_3CN.BH_3$ is formed, provided that the temperature does not rise above about 10° C. Nearly quantitative yields are obtained by use of dry petroleum ether solvent (B.P. 30–54° C.) at —20° C. or of isobutane at its boiling point (—11.7° C.). The last traces of solvent are removed by distillation under reduced pressure at —20° C. It was found to be necessary for these yields that the temperature of the acetonitrile be kept above its freezing point, i.e., about —40° C. In larger scale preparations isobutane is a more convenient solvent to handle than petroleum ether, because the reaction temperature is self-regulating and removal of solvent is easier after the reaction has been completed. About 150 cc. of solvent was used for 25 cc. of nitrile, although this ratio does not appear to be critical. The following analytical data have been collected on the solid product:

(a) Boron analysis, 19.3%; calculated for $CH_3CN.BH_3$, 19.7%
(b) Hydrolyzable hydrogen (by reaction with water), 5.43%; calculated 5.50%
(c) Molecular weight (in benzene), 67; calculated 55.

Agreement is satisfactory for the formula $CH_3CN.BH_3$ except for molecular weight. Partial conversion into liquid product at the melting point of benzene could easily account even for this difference. Hence, the solid isolated under the conditions described corresponds closely to that produced by the formula proposed by Schlesinger and Burg (Chem. Rev. 31, 1, year 1942) for the compound prepared in very small quantities at −80° C. The present synthesis is believed to be the only one thus far invented for preparing acetonitrile-borine in bulk.

Conversion of the solid acetonitrileborine to a liquid occurs slowly at room temperature, but more rapidly at 40° C. Once the reaction has begun, it is exceedingly vigorous and exothermic. Some gas, largely diborane, is evolved but the quantity is small and appears to be variable. If the reaction gets out of control, the major products are gas (largely diborane) and a tan solid. Reaction can be moderated by use of a solvent. In a benzene or toluene solution, reaction begins almost immediately but the yield of liquid product is poor, presumably because the more volatile portions are lost during removal of the solvent. By passage of diborane through a benzene solution of acetonitrile at between about 0° C. to about 50° C. inclusive followed by standing at room temperature, the liquid product may be prepared without isolation of the solid. However, the best yields of liquid product are obtained by using the material as its own solvent, and this method has been adopted for synthetic purposes.

To illustrate the process with an example, 22.5 grams of the solid addition product of acetonitrile and diborane was added in small portions with vigorous stirring to 5.8 grams of N-N'-N''-triethylhexahydro-s-triazaborine prepared as described in the preceding paragraph.

Reaction temperature was maintained at 40–44° C. at substantially atmospheric pressure until a homogeneous solution was formed. A clear water-white liquid (28.0 grams) was obtained, and fractional distillation under reduced pressure yielded about 8 g. of N-N'-N''-triethylhexahydro-s-triazaborine boiling at 92–94° at 80 mm. or 73–74.5° at 24.5 mm. of mercury.

The substance boiling at 92–94° C. at 80 mm. or 73–74.5° C. at 24.5 mm. was shown in the following steps to be N-N'-N''-triethylhexahydro-s-triazaborine:

(a) Elementary analysis—calculated for $C_6H_{18}N_3B_3$: C, 43.72%; H, 10.93%; N, 25.51%; B, 19.68%. Found: C, 43.90%; H, 10.56%; N, 25.35%; B, 20.2%.

(b) Molecular weight (cryoscopic in benzene) was 164.8; theoretical for $C_6H_{18}N_3B_3$ is 164.66.

(c) Hydrogen liberated on hydrolysis with 5% sodium hydroxide was 1.74%; the theoretical value is 1.82%.

(d) Acid hydrolysis with 12 N sulfuric acid gave nearly the theoretical quantity of ethylamine, isolated as N-ethylbenzene-sulfonamide.

(e) The identity of the compound was further established by the synthesis from ethylamine hydrochloride and lithium borohydride by following the method described by Schaeffer and Anderson (Journal of American Chemical Society 71, 2143, year 1949).

The most important chemical and physical properties of N-N'-N''-triethylhexahydro-s-triazaborine were determined. The substance appears to be stable when stored in dry air (standing in stoppered or sealed vials for eight months produced no visible change).

Physical constants are listed below:

Boiling point (736 mm.) ° C __ 171.6
Freezing point ° C __ 43.5
Refractive index, $n_D^{20}$ __ 1.4371
Specific gravity, $S_4^{20}$ __ 0.8221
Heat of combustion __ Kcal./g __ 8.984

The solubility of the substance is very high in benzene and gasoline, and is low in aniline. It is practically insoluble in water and anhydrous ammonia.

By the same technique developed for synthesis of N-N'-N''-triethylhexahydro-s-triazaborine from acetonitrile, N-N'-N''-tri-(3-methoxypropyl) hexahydro-s-triazaborine can be prepared from β-methoxypropionitrile and diborane. The solid addition compound, β-methoxypropionitrile borine, was not isolated but was permitted to isomerize to a liquid during evaporation of the solvent. As an example, diborane was passed through a stirred solution of 13.9 g. of β-methoxypropionitrile in 125 ml. of petroleum ether (B.P. 30–54° C.) until absorption was completed. After removal of the solvent by distillation under reduced pressure at −20° C., 15.3 g. of a pale yellow oil remained. Simple distillation of the liquid yielded 6.2 g. of a product boiling at 141–147° C. below 1 mm. pressure. This material was collected from several runs (a total of 29.4 g.) and was redistilled through an 8 cm. column packed with glass beads. Although much decomposition occurred, the main fraction distilled at 152° C. under a pressure of about 1 mm.

Elementary analysis of this fraction gave the following results: C, 48.65%; H, 10.49%; N, 14.10%; B, 10.84%.

Calculated values for N-N'-N''-tri-(3-methoxypropyl)-hexahydro-s-triazaborine ($C_{12}H_{30}N_3B_3O_3$) are: C, 48.53%; H, 10.21%; N, 14.15%; B, 10.93%.

Further confirmation that the compound was N-N'-N''-tri-(3-methoxypropyl)-hexahydro-s-triazaborine may be summarized as follows:

(a) Molecular weight (cryoscopic in benzene) was 318; calculated is 297.

(b) Quantitative hydrolysis with 5% sodium hydroxide showed 1.00% hydrolyzable hydrogen; theoretical is also 1.00%.

(c) The 3 location of the methoxyl group in the propyl chain was based on the assumption that rearrangement did not occur.

Other physical and chemical properties are listed below:

Freezing point __ below −110° C.
Refractive index $n_D^{20}$ __ 1.4569.
Specific gravity $S_4^{20}$ __ 0.9667.
Heat of combustion __ 7.16 Kcal./gram.

The substance is more stable in moist air than is N-N'-N''-triethylhexahydro-s-triazaborine and is spontaneously inflammable with white fuming nitric acid. Solubility in benzene and petroleum solvents is similar to that of the N-N'-N''-triethylhexahydro-s-triazaborine.

It is not intended that the invention should be restricted to the precise examples given, but that it should be considered to have a scope commensurate with the context of the following claim.

What is claimed is:

As a new chemical compound, N-N'-N''-tri-(3-methoxypropyl)-hexahydro-s-triazaborine.

References Cited in the file of this patent

UNITED STATES PATENTS 2,247,821 Ruthruff __ June 1, 1941
2,443,420 Gresham __ June 15, 1948

OTHER REFERENCES

Schlesinger: Chemical Reviews, vol. 31, page 21 relied on (1942).

Wiberg et al.: Zeitschrift fur Anorganische und Allgemeine Chemie, vol. 225, page 150 (1947).

Schaeffer et al.: Journal of the America Chemical Society, vol. 71, pages 2144 and 2145 (1949).

Schecter et al.: Boron Hydrides and Related Compounds (a Treatise), page 103, Jan. 8, 1951.

Hough et al.: Journal of the American Chemical Society, vol. 77, page 865 (1955).